United States Patent

Takano et al.

[11] Patent Number: 5,938,947
[45] Date of Patent: Aug. 17, 1999

[54] METHOD OF CONTROLLING WELDING CURRENT AND INVERTER-CONTROLLED DC RESISTANCE WELDING APPARATUS

[75] Inventors: Fumitomo Takano, Sakado; Kenji Miyanaga, Sayama, both of Japan

[73] Assignee: Honda Giken Kogyo Kabushiki Kaisha, Tokyo, Japan

[21] Appl. No.: 09/014,385

[22] Filed: Jan. 27, 1998

[30] Foreign Application Priority Data

Jan. 28, 1997 [JP] Japan ..................................... 9-014326

[51] Int. Cl.$^6$ ..................................................... B23K 11/24
[52] U.S. Cl. ............................................ 219/110; 219/109
[58] Field of Search .................................... 219/110, 108, 219/109, 117.1; 363/80; 361/45, 87

[56] References Cited

U.S. PATENT DOCUMENTS

| | | | |
|---|---|---|---|
| 5,360,959 | 11/1994 | Takano et al. | 219/110 |
| 5,406,045 | 4/1995 | Kiriishi et al. | 219/110 |
| 5,570,254 | 10/1996 | Spilger et al. | 363/80 |

FOREIGN PATENT DOCUMENTS

B2-8-4943  1/1996  Japan .

OTHER PUBLICATIONS

Patent Abstracts of Japan, JP2–284776A (Miyachi Electric Co.) "Inverter Type Resistance Welding Controller", M–1078, vol. 15, No. 49, Feb. 6, 1991.

*Primary Examiner*—Clifford C. Shaw

[57] ABSTRACT

Before a deterioration of a secondary current sensor is detected, a controller effects a feedback control process based on a secondary current from the secondary winding of a welding transformer which is energized by an inverter, for thereby controlling a welding current with a high degree of accuracy, e.g., an accuracy level of ±1%. At the same time, it is monitored whether a detected value of a primary current from the primary winding of the welding transformer, which is detected by a primary current sensor, exceeds a predetermined allowable range with respect to a reference value of the primary current. If the detected value of the primary current exceeds the predetermined allowable range, then it is decided that the secondary current sensor is deteriorated. When the secondary current sensor is deteriorated, the controller switches from the feedback control process based on the secondary current to a feedback control process based on the primary current to control the welding current with a certain degree of accuracy, e.g., an accuracy level of ±3%, without interrupting the welding process.

12 Claims, 5 Drawing Sheets

METHOD OF CONTROLLING WELDING CURRENT AND INVERTER-CONTROLLED DC RESISTANCE WELDING APPARATUS

BACKGROUND OF THE INVENTION

1. Field of the Invention

The present invention relates to a method of controlling a welding current through a feedback control loop, and an inverter-controlled DC resistance welding apparatus.

2. Description of the Related Art

Conventional inverter-controlled DC resistance welding apparatus convert a supplied DC voltage into a high-frequency AC voltage with an inverter which comprises switching elements, supplies the high-frequency AC voltage to the primary winding of a welding transformer, rectifies a high-frequency pulse voltage generated across the secondary winding of the welding transformer by way of, for example, full-wave rectification with a rectifier, and thereafter applies the voltage to a workpiece, which is to be welded, through a welding electrode. The inverter-controlled DC resistance welding apparatus of this type are advantageous in that the welding transformer is small in size and they utilize electric energy from the power supply with high efficiency.

Because of the small size, the welding transformer can be assembled in the tip end of a welding arm of a welding robot, with the result that the length of the arm from the output terminals of the secondary winding of the welding transformer to the welding electrode is relatively small. In applications which require a welding current of about 15000 A or more to weld steel sheets for automobile bodies, the relatively small arm length from the output terminals of the secondary winding of the welding transformer to the welding electrode is effective to reduce a voltage drop across the arm and the amount of heat generated thereby, resulting in an increase in the efficiency with which electric energy from the power supply is utilized.

The inverter-controlled DC resistance welding apparatus may employ a constant secondary current control process for controlling the welding current to be supplied to the workpiece, i.e., the current from the secondary winding of the welding transformer, at a preset constant reference value. According to the constant secondary current control process, the inverter is energized in a pulse-width-modulation (PWM) mode, and the secondary current from the welding transformer is detected by a current sensor such as a toroidal coil that comprises a toroidal core and a plurality of turns of an insulated wire such as an enameled wire wound around the toroidal core. The detected secondary current is compared with the constant reference value, and the pulse duration of the PWM mode is varied depending on the deviation of the detected secondary current from the reference value, so that the secondary current of the welding transformer will be brought into conformity with the constant reference value through a feedback control loop.

In the constant secondary current control process based on the feedback control loop, since the welding current is directly fed back for control, it can be controlled with an accuracy of about ±150 A (about ±1% if the welding current is 15000 A), for example, for thereby uniformizing the welding quality of the workpiece.

If the primary current is controlled using a feedback control loop, then since the welding current is indirectly controlled, it is controlled with an accuracy of about ±3%.

With the inverter-controlled DC resistance welding apparatus, as shown in Japanese patent publication No. 8-4943, for example, when the welding current (the secondary current) abruptly decreases owing to a change in the manner in which the welding electrode contacts the workpiece, the pulse duration and peak value of the primary current increase in order to make up for the reduction in the welding current. The increased energy of the primary current then tends to break the switching elements of the inverter. Japanese patent publication No. 8-4943 discloses a technique for preventing the switching elements from being broken. According to the disclosed technique, the primary current is also detected, and a primary current value corresponding to the preset reference value for the secondary current is calculated, with a limit level being established which is several % higher than the calculated primary current value. If the detected primary current exceeds the limit level while the secondary current is being supplied, i.e., while the workpiece is being welded with the secondary current, then the pulse duration of the primary current is limited to protect the switching elements against breakdown.

The inventors have found a phenomenon in which while the secondary current is being controlled using a feedback control loop, only the detected primary current increases continuously or stepwise to a certain level though the secondary current detected by the current sensor is of the preset reference value, i.e., a normal value.

In an effort to analyze the phenomenon, the inventors detached the toroidal coil, which is the current sensor for detecting the secondary current, from the welding apparatus and measured the impedance of the toroidal coil. The inventors have revealed that when a physical shock is applied to the current sensor during the measurement of the impedance thereof, the impedance (inductance) is reduced. It has also been found that there is a secondary current sensor whose impedance (inductance) is reduced even when no physical shock is applied to the current sensor during the measurement of the impedance thereof. Another finding is that when a brand-new toroidal coil is attached to the welding apparatus and the secondary current is controlled using a feedback control loop again, the detected secondary current and the detected primary current are free of variations.

It has been presumed from these findings that the efficiency with which the secondary current sensor converts a current into a voltage is lowered. If the secondary current sensor is degraded, then the above phenomenon, i.e., the phenomenon that only the detected primary current increases though the detected secondary current is of the preset reference value while the secondary current is being controlled using a feedback control loop, can be explained.

When the inventors disassembled and inspected the degraded current sensor, i.e., the degraded toroidal coil, they discovered a contact between the core and insulated wire of the toroidal coil or a rare short or a short circuit between adjacent ones of the turns of the insulated wire.

SUMMARY OF THE INVENTION

It is therefore an object of the present invention to provide a method of controlling a welding current highly accurately while making it possible to detect a reduction in the accuracy with which the welding current is detected, the method being capable of controlling the welding current with a predetermined degree of accuracy even when a reduction is detected in the accuracy with which the welding current is detected.

Another object of the present invention is to provide an inverter-controlled DC resistance welding apparatus.

The above and other objects, features, and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENT

Figure 1:
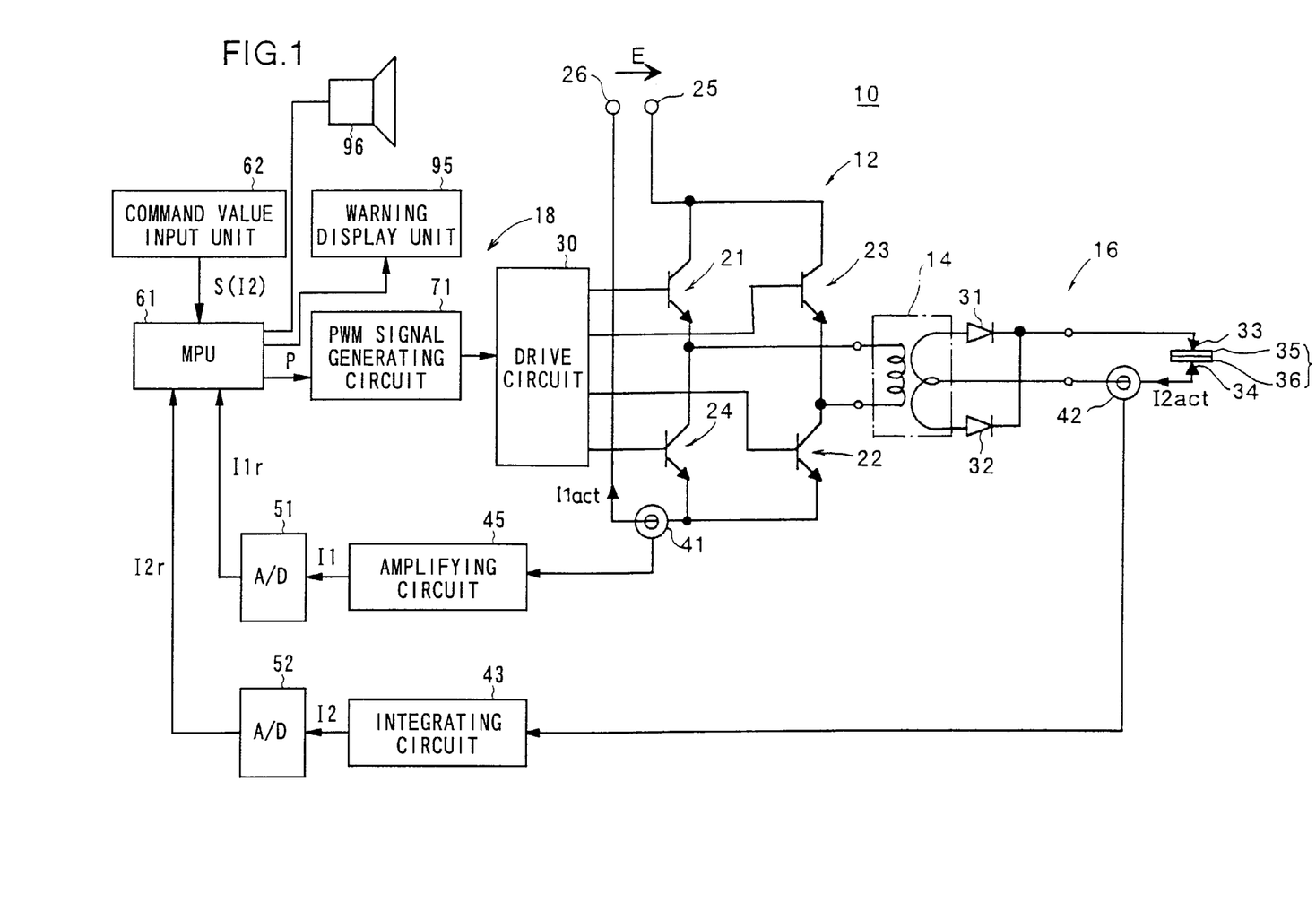
FIG. 1 is a block diagram of an inverter-controlled DC resistance welding apparatus according to the present invention.

As shown in FIG. 1, an inverter-controlled DC resistance welding apparatus 10 according to the present invention basically comprises an inverter 12, a welding transformer 14, a rectifying circuit 16, and a controller 18.

The inverter 12 comprises a bridge-connected circuit of power switching elements 21–24 such as IGBTs (insulated gate bipolar transistors), for example. The power switching elements 21, 23 have respective collectors connected to a common terminal 25, and the power switching elements 22, 24 have respective collectors connected to a common terminal 26. A DC voltage E, which may be generated by rectifying a three-phase AC voltage of 400 V or the like, is applied between the common terminals 25, 26. The power switching elements 21–24 have respective bases which are supplied with PWM drive signals from a drive circuit 30.

When the PWM drive signals are supplied to the bases of the power switching elements 21–24, the inverter 12 alternately repeats a state in which the power switching elements 21, 22 are turned on and the power switching elements 23, 24 are turned off and a state in which the power switching elements 21, 22 are turned off and the power switching elements 23, 24 are turned on, thereby converting the DC voltage E into a high-frequency AC voltage that is applied to the primary winding of the welding transformer 14, which as a central tap on its secondary winding.

When the high-frequency AC voltage from the inverter 12 is applied to the primary winding of the welding transformer 14, the welding transformer 14 develops across the secondary winding a high-frequency AC voltage depending on the ratio n (=100 in this embodiment) of the number of turns of the primary winding to the number of turns of the secondary winding. The rectifying circuit 16 comprises a pair of rectifiers 31, 32 connected to the secondary winding of the welding transformer 14. The high-frequency AC voltage developed across the secondary winding of the welding transformer 14 is converted by full-wave rectification into a substantially DC voltage which is applied through welding electrodes 33, 34 to a workpiece W that comprises two pieces 35, 36 to be welded.

A secondary current (also referred to as a welding current representing a signal or a value) I2act ("act" signifies a current actually flowing through the closed circuit connected to the secondary winding of the welding transformer 14) supplied from the secondary winding of the welding transformer 14 is detected by a current sensor 42 and then converted into a DC voltage by an integrating circuit 43. The DC voltage generated by the integrating circuit 43 is applied to an A/D converter 52 and converted thereby into a secondary current I2r (also referred to as a secondary detected current or a secondary detected current value, "r" signifying a read value) that is supplied to a microcomputer 61 of the controller 18. Each of the current sensor 42, the integrating circuit 43, and the A/D converter 52 produces a voltage output corresponding to the secondary current from the welding transformer 14. For an easier understanding, however, the A/D converter 52 is assumed to produce the secondary current I2r. The current sensor 42 may comprise a toroidal-coil sensor or a Rogowski-coil sensor.

Figure 2:
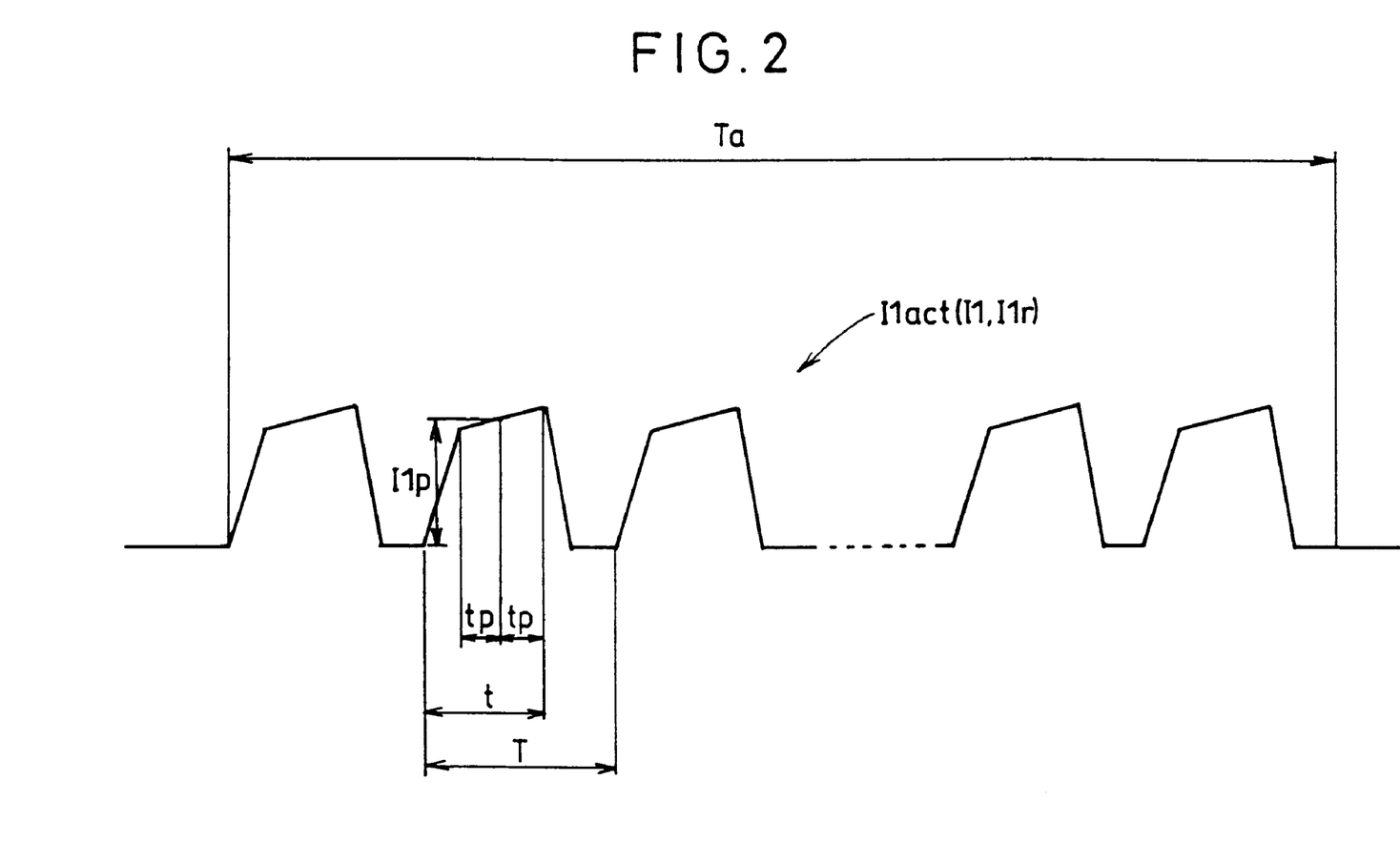
FIG. 2 is a waveform diagram showing, by way of example, a primary current during an energization period.

A primary current I1act, which is shown as a signal or a value in FIG. 2, from the primary winding of the welding transformer 14 is detected by a current sensor 41 such as a toroidal-coil sensor or the like, and supplied as a primary current I1 representative of a high-frequency AC voltage from an amplifying circuit 45 to an A/D converter 51, which converts the primary current I1 into a primary current I1r in the form of a digital signal. The primary current I1r is supplied to the microcomputer 61. Actually, the current value flowing through the primary winding of the welding transformer 14 is smaller than the current value flowing through the secondary winding of the welding transformer 14. If the inverter-controlled DC resistance welding apparatus 10 is incorporated in a welding robot, then the primary-side circuit including the inverter 12 for energizing the welding transformer 14 is housed in a casing (not shown), whereas the secondary-side circuit connected to the welding transformer 14 is supported on movable components placed in working environments. Therefore, since the current sensor 41 included in the primary-side circuit is essentially free of deterioration, the primary current I1r supplied to the microcomputer 61 is exactly commensurate with the primary current I1act that actually flows through the primary winding of the welding transformer 14.

The microcomputer 61 reads the DC secondary current (also representing its value) I2r in each PWM control cycle T (see FIG. 2) and also reads a peak value I1p of the primary current Ir1 in each PWM control cycle T. As shown in FIG. 2, the primary current Ir1 sharply rises from a starting point of the PWM control cycle T, and thereafter reaches a time after which the primary current Ir1 gradually increases. When one half tp, from that time, of the period during which the primary current Ir1 gradually increases elapses, i.e., at the midpoint of the period during which the primary current Ir1 gradually increases, the value of the primary current Ir1 is measured as the peak value I1p in each PWM control cycle T.

In this manner, the primary current I1r, whose peak value I1p is detected, and the secondary current I2r which are respective output signals from the A/D converters 51, 52 are supplied to the microcomputer 61.

The microcomputer 61 functions as driving, controlling, processing, and deciding means, and also as a feedback controlling means. As well known in the art, the microcomputer 61 is provided as a one-chip LSI device which includes a microprocessor (MPU) corresponding to a central processing unit (CPU), A/D and D/A converters connected as input and output devices to the microprocessor, I/O ports, a read-only memory (ROM) which stores a control program, a system program, and look-up tables, a random-access memory (RAM) for temporarily storing processed data, a timer circuit, and an interrupt processing circuit.

The microcomputer 61 is supplied with a command value signal (also referred to as a command value) S(I2) for the secondary current through a command value input unit 62 such as a keyboard or the like. The microcomputer 61 basically supplies discharge pulses P having pulse durations (representative of an interval t in FIG. 2) depending on the result of comparison between the command value S(I2) and the secondary current Ir2 to a PWM signal generating circuit 71. The PWM signal generating circuit 71 then generates and supplies a PWM signal having a pulse duration corresponding to the interval t to the drive circuit 30. Based on the supplied PWM signal, the drive circuit 30 produces PWM drive signals for energizing the power switching elements 21–24 in the sequence described above.

To the microcomputer 61, there are connected a warning display unit 95 such as a CRT, an LCD, or the like, and a speaker 96 for displaying visible warnings and generating audible warnings based on warning signals supplied from the microcomputer 61.

Figure 3:
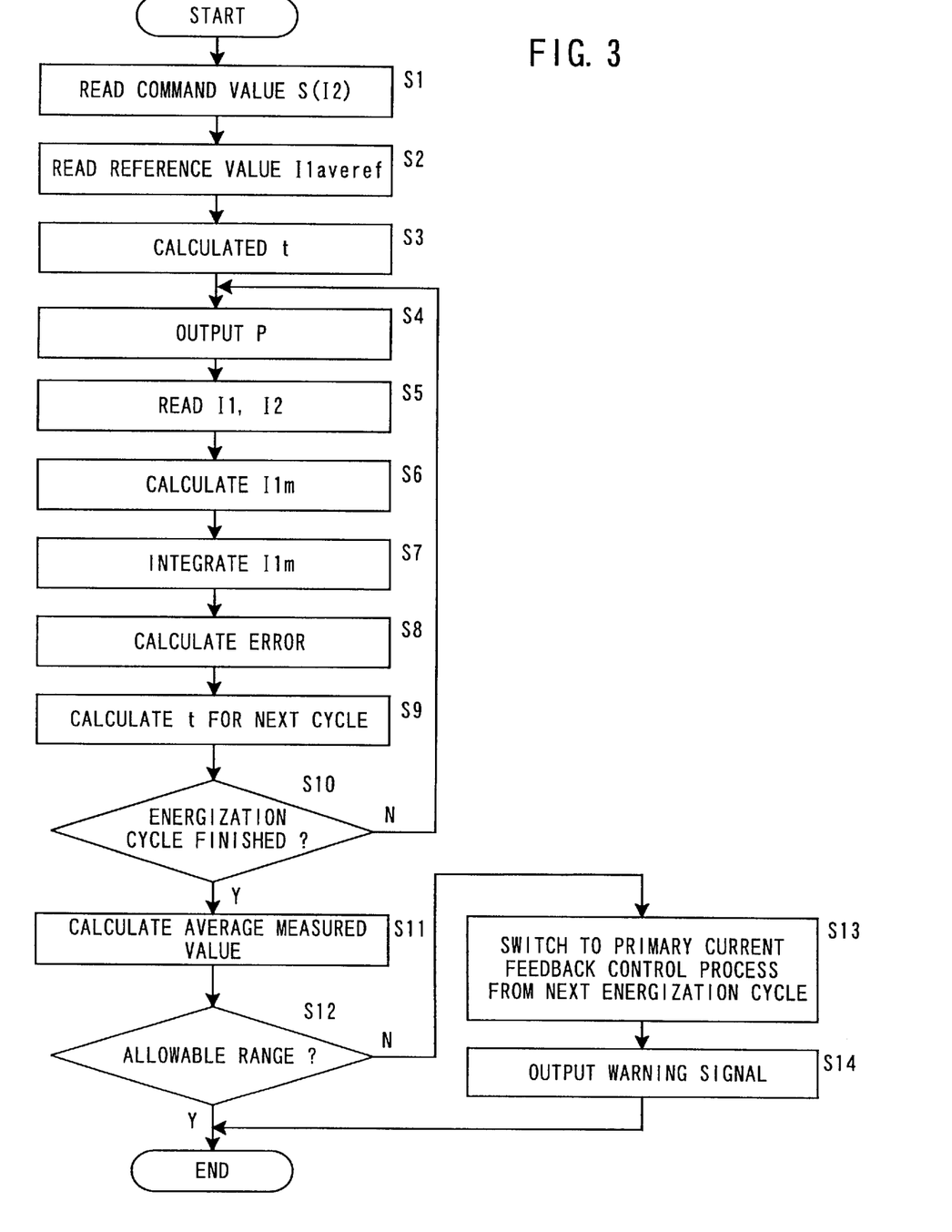
FIG. 3 is a flowchart of an operation sequence of the inverter-controlled DC resistance welding apparatus shown in FIG. 1.
Figure 4:
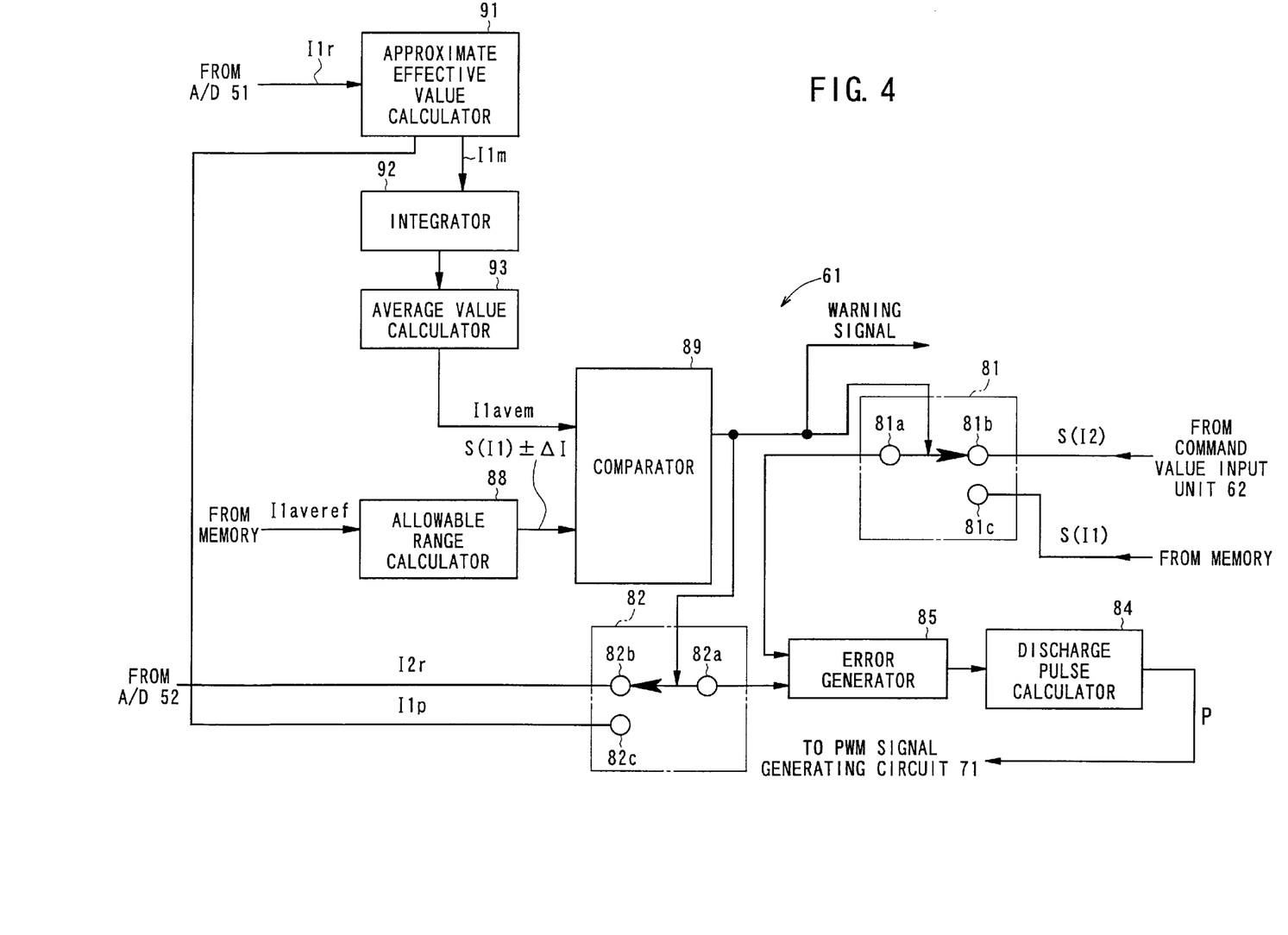
FIG. 4 is a block diagram of the functions of a microcomputer of the inverter-controlled DC resistance welding apparatus shown in FIG. 1.

Operation of the inverter-controlled DC resistance welding apparatus 10 shown in FIG. 1 will be described below with reference to FIGS. 3, 4, and 5A–5D. FIG. 3 shows an operation sequence of the inverter-controlled DC resistance welding apparatus 10, the operation sequence being controlled by the microcomputer 61. FIG. 4 shows functional blocks which are carried out by the microcomputer 61. The functional blocks shown in FIG. 4 may, however, comprise equivalent discrete components.

The operator enters a command value S(I2) for a welding current (secondary current) depending on the workpiece W (35, 36), through the command value input unit 62, and the microcomputer 61 reads the command value S(I2) in a step S1. Actually, when a product type associated with the workpiece W. specifically, an automobile type, for example, is selected, the thickness of steel sheets to be used and a welding gun arm to be used are automatically selected from a table stored in a memory (not shown) of the microcomputer, and corresponding welding conditions, specifically, a pressing time, an energizing time, a welding current value, etc. are also automatically selected from a table stored in the memory. The command value S(I2) for the secondary current signifies a command value (target value) for a welding current value among the welding conditions.

Figure 5A:
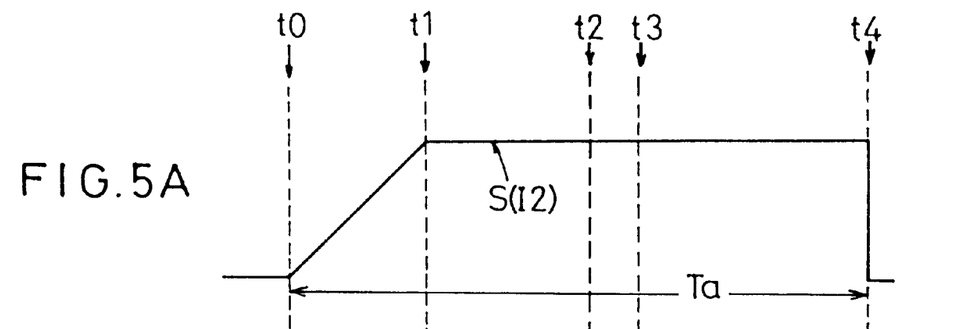
FIG. 5A is a waveform diagram showing a command value for a secondary current.

It is assumed, as shown in FIG. 5A, that the command value S(I2) read by the microcomputer 61 gradually increases from an energization starting time t0 to a time t1 according to a slow energization control process, and then remains constant from the time t1 to an energization ending time t4. The period from the energization starting time t0 to the energization ending time t4 corresponds to an energization period Ta shown in FIG. 2. For the sake of brevity, the waveform shown in FIG. 2 does not reflect the slow energization control process. The energization period (also called an energization time) Ta is also referred to as an energization cycle Ta in order to distinguish from each PWM control cycle T.

As shown in FIG. 4, the command value S(I2) is supplied through a fixed port 81b and a common port 81a of a multiplexer 81 to a reference input terminal of an error generator (error signal generator) 85. At the time t0, since no signal is supplied from a common port 82a of a multiplexer 82 to a comparison input terminal of the error generator 85, the command value S(I2) is outputted directly from the error generator 85 in the first PWM control cycle T, and supplied to a discharge pulse calculator 84.

Another fixed port 81c of the multiplexer 81 is supplied with a command value S(I1) for a primary current feedback control process from the non-illustrated memory. The command value S(I1) is calculated according to the following equation (1):

$$S(I1) = S(I2)/n \tag{1}$$

where n is ratio of the number of turns of the primary winding of the welding transformer 14 to the number of turns of the secondary winding thereof.

The multiplexer 82 has fixed ports 82b, 82c which are supplied with a detected secondary current I2r and a detected primary current I1p, respectively.

An average value I1averef of reference values for the primary current, to be supplied from the non-illustrated memory to an allowable range calculator 88, is stored as a value approximating an effective value in the memory. Specifically, if it is assumed that the peak value of the primary current in each PWM control cycle T, measured when the secondary current sensor 42 is normal, is indicated by I1pref, then a reference value I1ref for the primary current in each PWM control cycle T is calculated according to the following equation (2), and an average value I1averef of reference values for the primary current is calculated according to the following equation (3):

$$I1ref = I1pref \times \sqrt{(t/T)} \tag{2}$$

$$I1averef = (1/N)\Sigma I1ref \tag{3}$$

Therefore, the reference value I1ref for the primary current is calculated by multiplying the peak value I1p=I1pref of the primary current measured in each PWM control cycle T by the square root of a value produced by dividing the discharge pulse duration t by the period T of a PWM control cycle, and the average value I1averef of reference values for the primary current is calculated by dividing the sum of the reference values I1ref for the primary current in the respective PWM control cycles T by the number (i.e., the number of pulses in the energization cycle Ta) N of PWM control cycles in the energization cycle Ta.

Figure 5B:
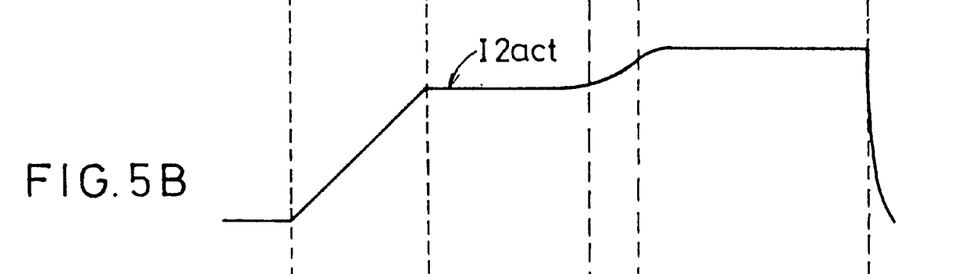
FIG. 5B is a waveform diagram showing an actual value of the secondary current.

The average value I1averaf, thus calculated, of reference values for the primary current in the energization cycle Ta is supplied to the allowable range calculator 88 in a step S2. FIG. 5D shows the reference value I1ref for the primary current in each PWM control cycle.

At the time t0, the discharge pulse calculator 84 calculates the pulse duration t of a discharge pulse in the first PWM control cycle T in a step S3, and supplies the calculated pulse duration t to PWM signal generating circuit 71 in a step S4. The PWM signal generating circuit 71 then supplies a PWM signal depending on the discharge pulse P to the drive circuit 30, which produces PWM drive signals (switching signals) that are applied to the inverter 12 to turn on and off the inverter 12. The inverter 12 supplies a primary current I1act to the welding transformer 14, which then supplies a secondary current I2act through the rectifying circuit 16.

The primary current I1act and the secondary current I2act are detected respectively by the current sensors 41, 42, and read as a primary current I1r and a secondary current I2r, respectively, by the microcomputer 61 in a step S5.

Specifically, the primary current I1r is supplied through the A/D converter 51 to an approximate effective value calculator 91, which calculates an approximate value of an effective value in a PWM control cycle T according to the following equation (4) which corresponds to the equation (2):

$$I1m = I1p \times \sqrt{(t/T)} \tag{4}$$

where I1p represents the peak value in the PWM control cycle (see FIG. 2).

Then, the calculated approximate value I1m is integrated after the PWM control cycle by an integrator 92 according to an equation (5), given below, in a step S7. Since there has been no past integrated value at the present time, the value of the equation (5) is equal to the value of the equation (4).

$$\Sigma I1m = \Sigma I1p \times \sqrt{(t/T)} \tag{5}$$

The error generator 85 compares the command value S(I2) for the secondary current and the secondary current I2r read in the step S5 with each other, and supplies an error (the difference between the command value S(I2) and the secondary current I2r) to the discharge pulse calculator 84 in a step S8. More specifically, the error generator 85 uses the command value S(I2) in the present PWM control cycle T as a target value, calculates the difference (error) between the target value and the secondary current I2r detected in the present PWM control cycle T, and supplies the calculated difference to the discharge pulse calculator 84.

Based on the supplied error and a target value as a command value S(I2) for a next PWM control cycle T, the discharge pulse calculator 84 calculates a pulse duration t (see FIG. 2) of a discharge pulse P in the next PWM control cycle T, and supplies the calculated pulse duration t to the PWM signal generating circuit 71 in a step S9.

Then, the microcomputer 61 ascertains whether an energization process according to the command value S(I2) read in the step S1 is finished or not based on the number N of PWM control cycles T in the energization cycle Ta in a step S10. If the energization process is not finished, then the microcomputer 61 repeats the steps S4–S9 until the energization process is finished, i.e., until the energization process in the present energization cycle Ta is finished.

If the energization process is finished, i.e., if the present energization cycle Ta in a secondary current feedback control process is finished, then an average value calculator 93 calculates an average measured value I1*avem* of the primary current in one energization period Ta according to the following equation (6) corresponding to the equation (3), by dividing the integrated value $\Sigma I1m$, calculated in the step S7, of approximate values I1m of primary current effective values in the energization period Ta, by the number N of PWM control cycles T in a step S11:

$$I1avem = (1/N)\Sigma I1m \tag{6}$$

The average measured value I1*avem* is supplied to a comparison input terminal of a comparator 89.

Then, in order to decide whether the secondary current sensor 42 is deteriorated or not, the comparator 89 compares the average measured value I1*avem* calculated according to the equation (6) and an allowable range I1*averaf* ±ÄI, which has been determined from the average value I1*averaf* of reference values for the primary current by the allowable range calculator 88 as described below, with each other in a step S12.

The allowable range calculator 88 takes into account an allowable error, e.g., α, predetermined with respect to the average value I1*averaf* calculated according to the equation (3), and calculates an allowable range as S(I1) ±ΔI according to the following equation (6):

$$I1averaf \times (1 \pm \alpha) = I1averaf \pm \Delta I \tag{7}$$

The value of the allowable error α may be positive only if it is assumed that only the secondary current sensor 42 is deteriorated, i.e., its efficiency to convert a detected current into a voltage is lowered. However, in order to prevent the inverter-controlled DC resistance welding apparatus 10 from malfunctioning due to measurement errors including variations in power supply voltages, signal fluctuations owing to wear of the welding electrodes 33, 34, variations in the pressure under which the welding electrodes 33, 34 are pressed against the workpiece W, and changes in measurement errors, the value of the allowable error α is selected to be ±3%, for example.

If the average measured value I1*avem* falls within the allowable range in the step S12, then the microcomputer 61 decides that the secondary current sensor 42 is not deteriorated and the welding process is finished normally, and continues the secondary current feedback control process using the secondary current I2. If the average measured value I1*avem* does not fall within the allowable range in the step S12, i.e., if the approximate value I1m (see FIG. 5D) of the effective value of the primary current in a PWM control cycle T, which corresponds to the read value of the primary current, increases from a time t2, for example, and exceeds an allowable range limit I1ref+ΔI at a time t3 and the actual secondary current I2act increases from the time t2 as shown in FIG. 5B, whereas the command value S(I2) (see FIG. 5A) and the read secondary current value I2r (see FIG. 5C) remain unchanged from the time t1 to the time t4, then the microcomputer 61 switches to the feedback control process based on the detected value (peak value) I1p of the primary current, i.e., the primary current feedback control process, from a next energization cycle Ta after the present energization cycle Ta at the time t4 in a step S13.

Specifically, for a next energization process after the time t4, the common ports 81a, 82a of the multiplexers 81, 82 are switched respectively to the fixed ports 81c, 82c depending on a binary signal (warning signal) indicative of the result of comparison effected by the comparator 89 in the step S12. Thereafter, the error generator 85 compares the primary current command value S(I1) as a reference signal and the detected value I1p of the primary current with each other, producing an error, and determines a pulse duration of discharge pulses P and supplies the determined pulse duration to the PWM signal generating circuit 71. In this manner, the primary current feedback control process using the primary current I1 is carried out.

The signal indicative of the result of comparison effected by the comparator 89 is converted by a video signal converter (not shown) into a video warning signal, which is outputted to display a warning message on the warning display unit 95 in a step S14. If necessary, the warning display unit 95 displays a message indicative of switching to the primary current feedback control process. Together with or independently of the display of the warning message, an audible warning may be produced by the speaker 96.

The allowable error α may not be a ratio, but a constant value during the energization period Ta.

The above operation of the inverter-controlled DC resistance welding apparatus 10 is summarized as follows: To control the welding current I2, a target value for the welding current I2 is given as a command value S(I2) to the microcomputer 61, which supplies discharge pulses P corresponding to the command value S(I2) to the PWM signal generating circuit 71 that generates a PWM signal.

The microcomputer 61 reads, through the current sensor 42, information representative of how the actual welding current I2*act* reflects the PWM signal generated by the PWM signal generating circuit 71.

The microcomputer 61 compares the detected secondary current value I2*r* and the command value S(I2) with each other. If there is an error, then the microcomputer 61 corrects the welding current I2. For example, if the detected secondary current value I2*r* is smaller than the command value S(I2), then the microcomputer 61 increases the pulse duration t of discharge pulses P.

If the current sensor 42 is deteriorated for some reason, then the detected secondary current value I2*r* becomes smaller than the actual secondary current I2*act*. Therefore, the error generator 85 generates an error, with the result that the actual welding current I2*act* is considerably larger than the target value. In order to avoid this condition, during the secondary current feedback control process, the microcomputer 61 detects the primary current I1, and calculates an average measured value I1*m* of the primary current I1 in each energization cycle T1. Then, the microcomputer 61 determines whether the average measured value I1*m* falls within the given allowable range I1*averaf* ±ΔI or not. If the average measured value I1*m* exceeds the given allowable range I1*averaf* ±ΔI, then the microcomputer 61 switches from the secondary current feedback control process to the primary current feedback control process and displays a warning from the next energization cycle Ti.

Figure 5C:
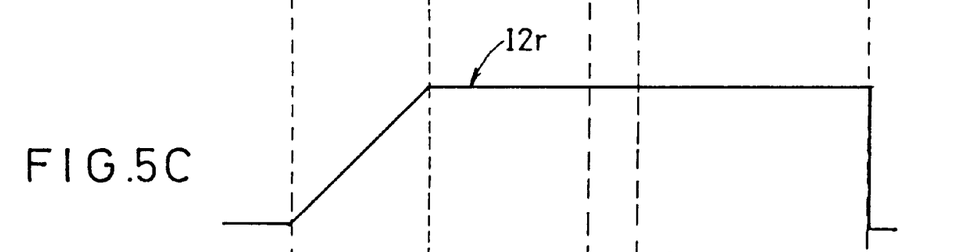
FIG. 5C is a waveform diagram showing a read value of the secondary current.
Figure 5D:
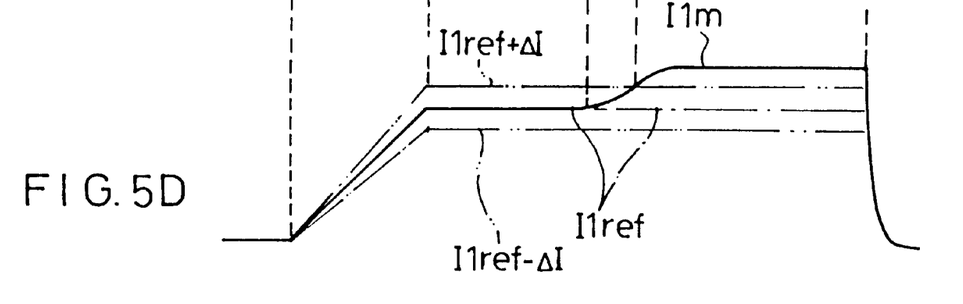
FIG. 5D is a waveform diagram illustrative of a process of controlling a primary current.

Therefore, even when the read value I2*r* of the secondary current varies as is the case with the command value S(I2) as shown in FIG. 5C, it is possible to detect a deterioration of the secondary current sensor 42. Furthermore, since the welding current (secondary current) is controlled indirectly based on the primary current from the next energization cycle, the workpiece W can be welded with a welding current within a predetermined range though the accuracy of the welding current is slightly lowered.

The quality of the welding of the workpiece W can be judged from the average measured value I1*m* of the primary current.

With the arrangement of the present invention, as described above, when the secondary current sensor is normal, the welding current is controlled highly accurately according to the secondary current feedback control process. During the secondary current feedback control process, it is ascertained whether the detected value of the primary current exceeds the allowable range of the primary current or not. If the detected value of the primary current exceeds the allowable range of the primary current, then it is estimated that the secondary current sensor is deteriorated. When such a deterioration of the secondary current sensor is detected, the secondary current feedback control process switches to the primary current feedback control process, so that the welding current can be controlled within a predetermined accuracy range of ±3%, for example,. without interrupting the welding process.

Consequently, even when the secondary current sensor is deteriorated, welding defects are minimized and the reliability of the welding process is increased, resulting in an increase in the yield of welded workpieces.

In addition, even when the secondary current sensor is deteriorated, the welding process can be continuously effected without being interrupted.

The operator can quickly recognize a deterioration of the secondary current sensor based on a visible or audible warning produced on the basis of a warning signal. Therefore, the operator may omit a periodical inspection routine for the inverter-controlled DC resistance welding apparatus 10.

Although a certain preferred embodiment of the present invention has been shown and described in detail, it should be understood that various changes and modifications may be made therein without departing from the scope of the appended claims.

What is claimed is:

1. A method of controlling a welding current, comprising the steps of:

energizing a primary winding of a welding transformer by an inverter;

detecting a secondary current from a secondary winding of the welding transformer;

detecting a primary current from the primary winding of the welding transformer while a secondary current feedback control process based on the secondary current is being carried out;

comparing the detected primary current with a predetermined allowable range for the primary current; and switching from the secondary current feedback control process to a primary current feedback control process based on the primary current if the detected primary current exceeds said predetermined allowable range.

2. A method according to claim 1, further comprising the step of:

issuing a signal indicative of a warning if the detected primary current exceeds said predetermined allowable range.

3. An inverter-controlled DC resistance welding apparatus comprising:

a welding transformer having a primary winding and a secondary winding connected to a workpiece to be welded;

an inverter for energizing said primary winding;

a primary current sensor for detecting a primary current from said primary winding;

a secondary current sensor for detecting a secondary current from said secondary winding; and a controller for effecting a secondary current feedback control process based on the secondary current detected by said secondary current sensor through said inverter, comparing the primary current detected by said primary current sensor with a predetermined allowable range for the primary current, and switching from said secondary current feedback control process to a primary current feedback control process based on the primary current detected by said primary current sensor through said inverter if the detected primary current exceeds said predetermined allowable range.

4. An inverter-controlled DC resistance welding apparatus according to claim 3, wherein said predetermined allowable range is set to either a ratio with respect to a reference value for the primary current or a constant value.

5. An inverter-controlled DC resistance welding apparatus according to claim 3, wherein said controller comprises means for effecting said secondary current feedback control process based on the secondary current detected by said secondary current sensor through said inverter, comparing the primary current detected by said primary current sensor with said predetermined allowable range for the primary current in each of energization cycles, and switching from said secondary current feedback control process to said primary current feedback control process from a next one of the energization cycles if the detected primary current exceeds said predetermined allowable range in one of the energization cycles.

6. An inverter-controlled DC resistance welding apparatus according to claim 5, wherein said inverter is energized according to a PWM process, and said detected primary current has an average value of detected values in each of control cycles of the PWM process in each of the energization cycles.

7. An inverter-controlled DC resistance welding apparatus according to claim 3, wherein said predetermined allowable range comprises a predetermined range of an average value of the primary current.

8. An inverter-controlled DC resistance welding apparatus according to claim 3, wherein said predetermined allowable range comprises ±3% of an average value of the primary current.

9. An inverter-controlled DC resistance welding apparatus according to claim 3, further comprising a display unit connected to said controller for displaying a visible warning if the detected primary current exceeds said predetermined allowable range.

10. An inverter-controlled DC resistance welding apparatus according to claim 3, further comprising a speaker (96) connected to said controller for producing an audible warning if the detected primary current exceeds said predetermined allowable range.

11. An inverter-controlled DC resistance welding apparatus according to claim 3, wherein said secondary current sensor comprises a toroidal-coil sensor or a Rogowski-coil sensor.

12. An inverter-controlled DC resistance welding apparatus according to claim 3, wherein said controller comprises means for ascertaining whether the workpiece is acceptable or not from an average measured value of the primary current when the secondary current is supplied from said secondary winding to the workpiece.

* * * * *